United States Patent [19]

Saeki et al.

[11] Patent Number: 4,912,501
[45] Date of Patent: Mar. 27, 1990

[54] AUTOMATIC ORIGINAL CIRCULATING AND FEEDING APPARATUS

[75] Inventors: Shiro Saeki; Sunao Ikeda, both of Yokohama, Japan

[73] Assignee: Ricoh Company, Ltd., Tokyo, Japan

[21] Appl. No.: 352,293

[22] Filed: May 16, 1989

Related U.S. Application Data

[63] Continuation of Ser. No. 177,479, Apr. 1, 1988, Pat. No. 4,860,057.

[30] Foreign Application Priority Data

Apr. 3, 1987 [JP] Japan .................................. 62-83548

[51] Int. Cl.$^4$ ....................... G03B 27/32; G03B 27/52
[52] U.S. Cl. ...................................... 355/23; 271/3.1; 355/24; 355/75; 355/313; 355/317
[58] Field of Search ................. 355/23, 313, 318, 319, 355/320, 317, 322, 308; 271/3.1

[56] References Cited

U.S. PATENT DOCUMENTS

| | | | |
|---|---|---|---|
| 4,140,387 | 2/1979 | Gustafson | 355/319 |
| 4,413,901 | 11/1983 | Kollar | 355/322 |
| 4,419,007 | 12/1983 | Kingsley | 355/313 |
| 4,469,436 | 9/1984 | Jones et al. | 355/318 X |
| 4,674,866 | 6/1987 | Tanaka | 355/23 |
| 4,688,928 | 8/1987 | Iwai | 355/319 |
| 4,699,365 | 10/1987 | Smith et al. | 271/3.1 |
| 4,727,401 | 2/1988 | Partilla et al. | 355/319 |
| 4,731,637 | 3/1988 | Acquaviva et al. | 355/317 |
| 4,734,736 | 3/1988 | Randall | 355/320 |
| 4,744,553 | 5/1988 | Hirose | 271/3.1 |
| 4,751,550 | 6/1988 | Murakami | 355/313 |
| 4,769,674 | 9/1988 | Kitajima et al. | 355/318 X |
| 4,777,511 | 10/1988 | Takahashi | 355/319 |
| 4,788,575 | 11/1988 | Ito et al. | 355/308 |
| 4,819,023 | 4/1989 | Kitahara | 355/23 X |
| 4,849,788 | 7/1989 | Prebola | 355/313 X |
| 4,860,057 | 8/1989 | Saeki et al. | 355/23 |

Primary Examiner—Richard A. Wintercorn
Attorney, Agent, or Firm—Oblon, Spivak, McClelland, Maier & Neustadt

[57] ABSTRACT

An automatic original circulating and feeding apparatus apparatus comprises an original feeding base for receiving a plurality of originals thereon, which are piled up with image faces thereof turned downwardly, an original separating and feeding device for successively separating the piled up originals on the original feeding base one by one from a lowermost original and feeding them one by one in an order separated, a reversible and speed-changeable belt conveyor device disposed in an exposure part for exposing each of the originals fed, and a sensor disposed at a position separated by at least the largest original length from the original separating and feeding mechanism, for selectively setting a scanning copy mode or a sheet through copy mode and for controlling a position of the original for a copy mode selected.

8 Claims, 6 Drawing Sheets

AUTOMATIC ORIGINAL CIRCULATING AND FEEDING APPARATUS

This is a continuation, of application Ser. No. 07/177,479, filed on Apr. 1, 1988, now U.S. Pat. No. 486 0057, issued 8/22/89.

BACKGROUND OF THE INVENTION

This invention relates to an automatic original circulating and feeding apparatus in a copying machine.

Some of the conventional copying machines is provided with an automatic original circulating and feeding apparatus, i.e. what is called RADF, which, for the purpose of improving the original processing capacity of a copying machine, permits a plurality of originals to be copied in a plurality of cycles by causing the originals to be automatically fed and recovered cyclically.

The RADF of this operating principle is generally provided with a frictional type paper separating mechanism for successively separating one by one originals piled up on an original feeding base from the lowermost original and forwarding them one by one to the copying machine.

Now, the conventional RADF is considered here as applied to the copying of double-faced originals. These double-faced originals piled up in the consecutive order of page numbers are set on the original feeding base in such a manner that the first page will form the uppermost original turned upwardly and the originals will be forwarded to the copying machine in the reverse order of page numbers. In this case, since the last page which is copied first is turned downwardly on the original feeding base, it must be turned upside down before it is forwarded onto a contact glass and set in the copying position. This is because the penultimate page constitutes itself a downwardly turned copy surface on the contact glass when this conveyance of the page is made on a turn feed route. The original in this state, therefore, is turned upside down on a switchback type route so that it will be placed on the contact glass with the last page turned downwardly. This operation inevitably requires each original to be conveyed and set through an idle step which has no part at all in the actual copying machine, entailing waste of time and impairing efficiency of the copying operation. Again when the penultimate page is to be copied, the same original must be sent through the same route before it is set on the contact glass. While one original is being copied, none of the feed routes is allowed to admit the next original. Thus, the conventional RADF necessitates a waiting time and, in this respect, operates with a slow processing rate. Particularly when the copying machine proper is capable of a high-speed processing, it is compelled to be operated at a lowered speed because the RADF of such a slow processing rate cannot keep pace with the high-speed operation of the copying machine. As the result, the use of the RADF prevents any effort to improve the CPM (copies per minute; efficiency of copying work).

When the double-faced originals are piled up consecutively in the order of page numbers with each of the originals turned upside down, the originals can be forwarded solely through a feed route to the copying machine. This setup, however, entails a troublesome work of causing all the originals to set severally upside down.

Even in the case of single-faced originals, they are fed out and recovered consecutively in the order of page numbers with the original-bearing face of each original turned upwardly. Since the time to start feeding the next original is restricted for the purpose of preventing two originals from passing each other on the contact glass, this arrangement also impedes the improvement of CPM.

SUMMARY OF THE INVENTION

In the light of the true state of affairs of the prior art described above, this invention aims to provide an automatic original circulating and feeding apparatus which the originals are set as turned downwardly and fed out consecutively in the order of page numbers, enables the original feeding work to be carried out at a speed matched to the speed of the continuous operation of the copying machine proper, thereby permitting the improvement of the CPM and, at the same time, enabling the feeding work to be optimized to suit either single-faced originals or double-faced originals.

The present invention provides an automatic original circulating and feeding apparatus comprising an original feeding base for receiving a plurality of originals thereon, which are piled up with image faces thereof turned downwardly, an original separating and feeding mechanism for successively separating the piled up originals on the original feeding base one by one from a lowermost original and feeding them one by one in a order separated, a reversible and speed-changeable belt conveyor mechanism disposed in an exposure part for exposing each of said originals fed, and a sensor disposed at a position separated by at least the largest original length from the original separating and feeding mechanism for selectively setting a scanning copy mode for forwarding a given original to a predetermined position above the exposure part, stopping the original at the predetermined position and setting an optical exposure system into a scanning motion for exposure or a sheet through copy mode for stopping the optical exposure system relative to the exposure part and forwarding the original by the belt conveyor mechanism for exposure and for controlling a position of the original for a copy mode selected.

Since the automatic original circulating and feeding apparatus according to this invention is constructed as described above, piled up originals arranged consecutively in the order of page numbers and set on the original feeding base with the image faces turned downwardly can be forwarded continuously in the order of page numbers and copied at a speed matched to the speed of the continuous copying speed of the copying machine proper without being affected by the resistance exerted in the original separating and feeding mechanism. In the copying of single-faced originals, for example, the selection between the scanning copy mode keeping the original stopped and the optical exposure system in operation and the sheet through copy mode keeping the optical exposure system stopped and the original conveying system in operation and the selection between the RADF mode and the ADF mode both can be made freely and the copying machine as a whole is enabled to enjoy an improved CPM.

DESCRIPTION OF THE PREFERRED EMBODIMENT

This invention is not limited to the embodiments to be specifically cited herein. It may be practised as modified or altered or altered in numerous ways without departing from the spirit of the invention.

First, the conventional countertype will be described in detail below for clarifying the distinction of the present invention.

Figure 9:
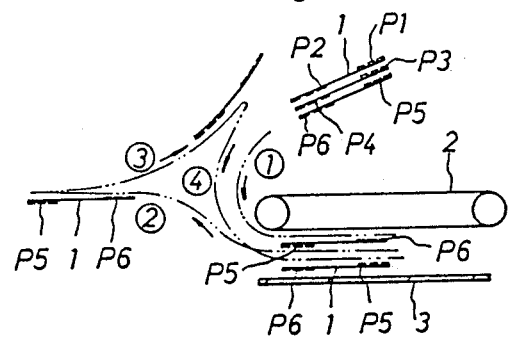
FIG. 9 is an explanatory diagram illustrating a route for passage of double-faced originals in the conventional copying machine during the course of copying.

When double-faced originals 1 are to be copied as illustrated in FIG. 9, these double-faced originals 1 are consecutively set in the order of page numbers as indicated by P1~P6 with the first page P1 lying in the uppermost position as turned upwardly and they are fed out in the reverse order of page numbers, with the sixth page P6 to be copied first. Here, the sixth page P6 to be copied first is turned downwardly on the original feeding base, it must be turned upside down so as to be forwarded to and readied for copying on a contact glass 3 which is provided with a conveyor belt 2. Otherwise, the fifth page P5 constitutes itself a downwardly turned copy face on the contact glass 3 when the sheet bearing the sixth page P6 is conveyed along a turn feed route as indicated by 1 . Thus, the original 1 as held in the state mentioned above is turned upside down by means of a switch-back type feed route as indicated by 2 , 3 , and 4 so that the sixth page P6 will be forwarded to and set on the contact glass 3 as turned downwardly. This means that the original is forwarded and set by being passed through an idle step which has no part at all in the actual copying work, entailing waste of time and impairing the efficiency of copying work. When the fifth page P5 is to be subsequently copied, the same original bearing the fifth original must be similarly passed through the feed route as indicated by 2 , 3 , and 4 before it is set on the contact glass 3. Further, the feed route as indicated by 1 , 2 , 3 , and 4 , while one original 1 is being copied, is not allowed to admit the next original. Thus, this setup necessitates a waiting time and, in this respect, operates at a low processing rate. Particularly when the copying machine proper is capable of a high-speed processing, it is compelled to be operated at a lowered speed because the RADF of such a slow processing rate cannot keep pace with the high-speed operation of the copying machine. As the result, the use of the RADF prevents any effort to improve the CPM (copies per minute; efficiency of copying work).

When the double-faced originals 1 are piled up in the descending order of P2, P1, P4, P3, P6, and P5 with respect to the diagram of FIG. 9, the originals may be processed only through the feed route of 1 . This setup, however, entails a disadvantage that all the originals 1 must be set up as arranged in the aforementioned order.

Figure 10:
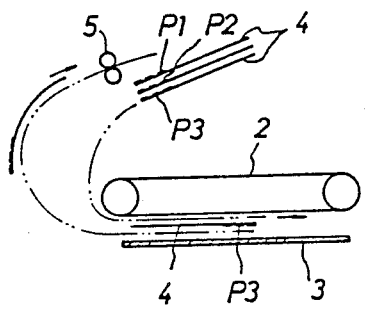
FIG. 10 is an explanatory diagram illustrating a route for passage of single-faced originals in the conventional copying machine during the course of copying.
Figure 11:
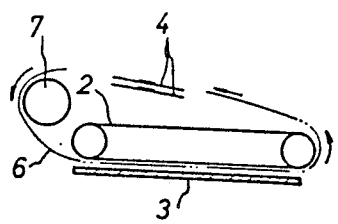
FIG. 11 is an explanatory diagram illustrating a looped route for passage of originals in the conventional copying machine.

Even in the case of single-faced originals 4, they are set consecutively in the order of page numbers with the image faces thereof turned upwardly as illustrated in FIG. 10, then forwarded through the feed route of 1 in the reverse order of page numbers, and discharged and recovered through the feed route of 4 via a discharge roller 5. The time to start feeding the next original is restricted for the purpose of preventing two originals from passing each other on the contact glass 3. Thus, this setup enjoys no improvement of CPM.

Now, the present invention will be described more specifically below with reference to preferred embodiments illustrated in the accompanying drawings. First, as illustrated in FIG. 1 through FIG. 4, an RADF 12 is disposed in such a manner as to cover a contact glass 11 which is disposed on the upper side of a copying machine proper 10. The RADF 12 is provided with a belt conveyor mechanism 17 comprising a conveyor belt 16 supported between a driving roller 13 and a driven roller 14 and furnished with a plurality of pressure rollers 15. At the upstream position to the right of this belt conveyor mechanism 17, an original feeding base 18 and an original separating and feeding mechanism 19 are disposed in the direction of the aforementioned contact glass 11 side. The original feeding base 18 is disposed as inclined toward the contact glass 11 side and adapted to permit a plurality of originals 20 piled up consecutively in the order of page numbers, with the image faces thereof turned downwardly. This original feeding base 18 is provided with a movable side fence 21 adapted to permit positioning of the originals in the direction of width. The original separating and feeding mechanism 19 is interposed between the original feeding base 18 and the contact glass 11 and is provided with a feed route 22 which continues to the loading surface of the original feeding base 18 and communicates with the contact glass 11. Below the original feeding base 18, a semicircular pinching roll 23 made of sponge of coefficient of frictional $\mu = 1.0$, and a Milar film 24 adapted to press an original 20 against the pinching roll 23 are disposed. There are further disposed a separating roller 25 made of murubber, for example, and a separating blade 26 held in pressed contact with the separating roller 25 and made of urethane having coefficient of friction $\mu$, of not less than 1.2. Here, an electromagnetic clutch (not shown) is connected to the pinching roll 23 and the separating roller 25. While the feeding of originals is started, it is driven at a rate of one rotation per original. Then it is driven by the motion of the original 20. On the contact glass 11 side, a pair of pullout rollers 27, 28 are disposed.

An original sensor 29 is interposed between the pinching roll 23 and the separating roller 25. Another original sensor 30 is located immediately before the contact glass 11.

A reverse feeding mechanism 31 is disposed on the downstream side to the left of the belt conveyor mechanism 17. This reverse feeding mechanism 31 is formed mainly of a turn roller 32 of a large diameter. A roller 33 and a turn guide 34 disposed contiguously with the turn roller 32 jointly form a reverse route 35 around the periphery of the turn roller 32. The reverse route 35 is provided at the outlet thereof with a switch gate 36 serving to switch a conveyor route as a first switch plate gate device is rotatably disposed. Further, the turn roller 32 is provided on the following roller 14 side thereof with a guide claw 37. Around the inner side (conveyor belt 16 side) of the turn roller 32, a reverse feeding route 38 is formed as directed toward the aforementioned contact glass 11 side. An original sensor 39 is located immediately before the feed roller 33.

A discharging device 41 is also located which is provided with a discharge route 40 substantially horizontally interconnecting the outlet of the reverse feeding mechanism 31 provided with the switch gate 36 and the upper part of the original feeding base 18. The discharge route 40 is formed of a guide part 43 made of a RADF cover 43 as a device cover and a guide member 44. A plurality of paired conveyor rollers 45, 46, and 47 are disposed as opposed to the discharge route 40. A discharge roller 48 is disposed near the original feeding base 18.

A switchback reverse conveyor mechanism 49 as a discharge feeding mechanism adapted to effect selective passage of a document is disposed halfway along the length of the discharge route 40 in the discharging device 41. This switchback reverse conveyor mechanism 49 comprises a turn roller 50 having a diameter equal to the diameter of the aforementioned turn roller 32, a triangular guide member 53 disposed on the paper discharge side from the turn roller 50 and adapted to form a turn route 51 and a straight discharge route 52, a switch claw 54 as second switch gate serving to switch between the turn route 51 and the straight discharge route 52, feed rollers 55, 56 held in contact with the turn roller 50 with the turn route 51, and a switchback route 57 utilizing the upper side of the RADF cover 42.

At a prescribed position of the discharge route 40, at the inlet to the turn roller 50, and on the turn roller 50, original sensors 58, 59, and 60 are respectively disposed. Further, the guide member 53 is provided at the leading end side thereof with a paired conveyor rollers 61. A discharge sensor 62 is disposed on the nearer side of the discharge roller 48.

The present embodiment is allowed to select either the scanning copy mode for keeping the original 20 at the prescribed position $P_2$ on the contact glass 11 and setting an optical exposure system 64 such as of a lamp 63 into a copying motion from the home position HP or the sheet through copy mode for keeping the optical exposure system 64 such as the lamp 63 directly below the pressure roller 15 on the driven roller 14 side and forwarding the original 20 at a prescribed speed by the conveyor belt 16 to effect desired copying. On part of the optical exposure system 64, a resist sensor 65 is mounted as opposed to the contact glass 11. It is employed for the control of the position for stopping the original during the scanning copy mode or for aligning the leading end of the original 20 in motion with the leading end of the transfer paper on the copying machine proper 10 side during the sheet through copy mode.

Figures 1, 2:
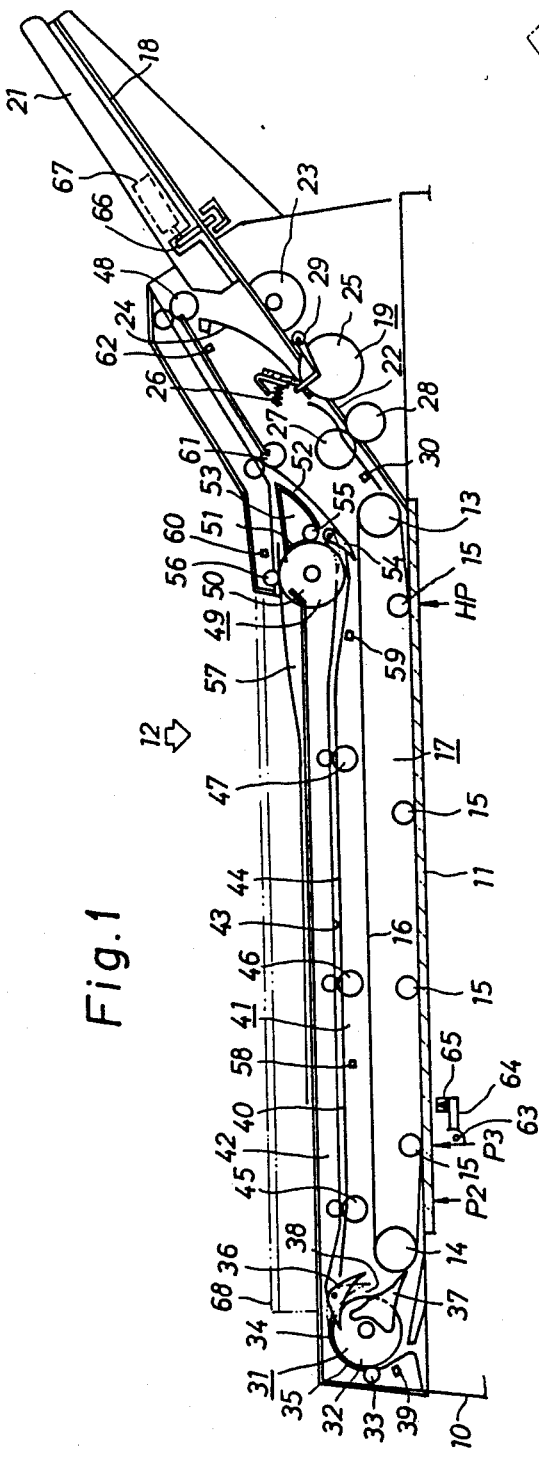
FIG. 1 is a side view illustrating one embodiment of this invention.
FIG. 2 is a schematic view illustrating a drive transmission system in the embodiment.

Then, the construction of the drive transmission system in the RADF 12 of the present embodiment will be described below with reference to FIG. 2. A first motor 70 for actuating the original separating and feeding mechanism 19 is provided. With a motor cogwheel 71 on the axis of the first motor 70, two stepped cogwheels 72, 73 disposed on pullout roller (upper) shaft 28a are meshed through the medium of an intermediate cogwheel 74. A cogwheel 75 on the separating roller shaft 25a is meshed with the motor cogwheel 71 through the medium of the aforementioned intermediate cogwheel 74. A cogwheel 78 on the pinching roll shaft 23a is meshed with the cogwheel 71 through the medium of a cogwheel 76 coaxial with the cogwheel 75 and an intermediate cogwheel 77. The pullout roller 28 is set at a high pressure enough to forward the original 20 in spite of the pressure of separation exerted on the separating part.

There is also provided a second motor 79 serving to actuate the driving roller 13 for the conveyor belt 16. This second motor 79 is of the DC servo type. A motor cogwheel 80 disposed on the axis of the second motor 79 is meshed with a cogwheel 81 on the aforementioned driving roller shaft 13a through the medium of intermediate cogwheels 82, 83 and a cogwheel 84. The driving roller 13 is reversibly driven by the second motor 79 with the speed thereof freely controlled.

There is further provided a third motor 85 for driving part of the reverse feeding mechanism 31 such as turn roller 32 and the discharge device 41. A pulley 88 is fitted on the axis of a cogwheel 87 which is meshed with a motor 86 on the axis of this third motor 85. Between this pulley 88 and a pulley 89 on the turn roller shaft 31a and pulleys 90, 91, and 92 disposed on the conveyor roller (lower) shafts 45a, 46a, and 47a, a timing belt 94 is passed through the medium of a pressure guide roller 93. Again in this case, the speed at which the turn roller 32, etc. are driven is varied by changing the revolution number of the third motor 85.

There is provided a fourth motor 95 which serves for the switchback reverse feeding mechanism 49 and the discharge roller 48. A pulley 98 is fixed on the shaft of a cogwheel 97 which is rotated by a cogwheel 96 on the shaft of the fourth motor 95. A belt 100 is passed between the pulley 98 and a pulley 99 on the turn roller shaft 50a. Between this pulley 98 and pulleys 101, 102 on the roller shaft 61a and the discharge roller shaft 48a, a belt 103 is passed. The turn roller 50 and the discharge roller 48 are allowed to vary their speeds by the change of the revolution number of the fourth motor 95.

The distance between the turn roller 32 of the reverse feeding mechanism 31 and the turn roller 50 of the switchback reverse feeding mechanism 49 is greater than the maximum length of original (the longitudinal size of A3, for example). The distance between the sheet through position $P_3$ and the pullout rollers 27, 28 is also greater than the maximum length of the original.

Now, the feeding operation performed on the original 20 set on the original feeding base 18 in the construction described above will be explained below. The originals 20 are set as piled up consecutively in the order of page numbers, with the image faces turned downwardly. As the copy button on the copying machine proper 10 side is turned on, a motor 167 serving for a patition plate 166 which partitions a pile of originals 20 is turned on to set the partition plate 66 on the originals 20. Then, the first motor 70 is set operating and the pinching roller 23 and the separating roller 25 are actuated to separate and feed out the lowermost original 20 toward the pullout rollers 27, 28. It is then forwarded on the contact glass 11 by the pullout rollers 27, 28 and the conveyor belt 16. As regards speeds of operation, the speed of the separating roller 25 is fixed at about 500 mm/s and the speeds of the pullout rollers 27, 28 and the conveyor belt 16 are fixed approximately in the range of 750 to 800 mm/s.

These operations of separating and feeding of originals are carried out in common based on varying operation modes. Now, the operations of varying modes will be described. First, the sheet through copy mode (RADF mode) will be explained. This mode is selected where a finisher or a doggy tail is used for after-treatment of a copy paper and the condition in which the relation of the original to the copy is 1:1 is repeated. In this mode, the optical exposure system 64 is kept stopped directly below the pressure roller 15 on the driven roller 14 side. While the apparatus is in this state, since the original 20 is forwarded as pressed down against the surface of the contact glass 11 by the pressure roller 15, it is not suffered to rise from the contact glass and consequently is prevented from producing an uneven image due to jittering, for example. When the resist sensor 65 detects the arrival at a prescribed point of the leading end of the original 20 which has been brought up on the contact glass 11 by the conveyor belt 16, the speed of the travel of the conveyor belt 16 is changed from a high to a low level and, at the same time, the motion of a transfer paper within the copying machine proper 10 is synchronized with the new speed of the conveyor belt, as a step preparatory to sheet through copying. In this case, the trailing end of the original 20 completes departure from the pullout rollers 27, 28 by the time the leading end thereof reaches the position $P_3$ for sheet through exposure. Since the position $P_3$ for the sheet through exposure is set on the left end side of the conveyor belt 16, the original being forwarded on the conveyor belt 16 for the sheet through copying can be advanced and exposed to light at a fixed speed in a state perfectly free from the influence of such load as pressure of separation exerted by the separating roller 25 and the pullout rollers 27, 28. Again in this respect, the freedom of copied image from such adverse phenomena as jittering is ensured all the more.

In the meantime, the leading end of the original 20 being advanced on the conveyor belt 16 as simultaneously exposed to light continues its travel toward the reverse route 35 and the discharge route 40 from above the contact glass 11. At this time, the turn roller 32 or the conveyor rollers 45, 46, and 47 are driven at a speed equal to or slightly lower than the speed of the conveyor belt 16. As the result, the original 20 is not drawn by the turn roller 32 or any other roller but is advanced on the contact glass 11 at the fixed speed governed by the conveyor belt 16.

When the advance of the original 20 in the manner described above proceeds and the leading end of the original reaches the neighborhood of the turn roller 50, since the switch claw 54 keeps the turn route 51 side open during the present mode, the original 20 advances around the turn roller 50 and continues its travel toward the switchback discharge route 57 utilizing the upper surface of the RADF cover 42. At this time, the trailing end of the original completes its departure from the exposure position. As the sensor 60 detects the arrival at a prescribed point of the trailing end of the original, the conveyance on the roller 50 is stopped and the turn roller 50 is driven backwardly. As the result, the original 20 whose leading end has been advancing toward the switchback discharge route 57 is now caused to make a switchback change of its direction of travel and consequently forwarded toward the discharge roller 46 side by the turn roller 50 with the tailing end at the lead. Since these rollers 50, 46 are rotating at high speed in this while, the original 20 is released by the discharge roller 48 onto the original feeding table 18.

Now, the feeding of a subsequent original 20 will be considered. When a prescribed time elapses after the complete departure of the trailing end of the preceding original 20 advanced on the conveyor belt 16 for the purpose of the sheet through exposure is detected by the sensor 30, the first motor 70 is set rotating and the pinching roll 23 and the separating roller 25 are caused to start separating and the lowermost one of the piled originals 20. When the sensor 30 detects the arrival of the leading end of the subsequent original 20, the pullout rollers 27, 28 are switched to a state of low-speed driving to advance the subsequent original toward the contact glass 11 as kept at a fixed distance from the trailing end of the preceding original on the contact glass 11.

In the manner described above, the plurality of originals 20 piled up on the original feeding base 18 are consecutively forwarded in the order of their page numbers toward the contact glass 11 from the lowermost sheet upwardly, subjected to the copying by the sheet through exposure, and recovered successively on the original feeding base 18 again in the order of their page numbers. When the last of the piled originals is fed out, this fact is detected by the gravimetric rotary fall of the partition plate 66. When the last original is recovered, it is set by the motor 67 at the top of the pile. Thus, the pile of originals is ready for the next cycle of feeding. The operation described above is repeated until a desired number of copies has been produced.

During the course of the sheet through copy mode, the original 20 is exposed to light as simultaneously advanced at a fixed speed by the conveyor belt 16. In this case, when the condition of the fixed-speed conveyance of the conveyor belt 16 is rendered variable in a plurality of steps, the copying machine is allowed to produce copies of images magnified by varying ratios.

The scanning copy mode (ADF mode) in which the original is fixed in place and the optical exposure system 64 is caused to produce a scanning motion is selected where a sorter is employed for the aftertreatment of a copied paper and the first of the plurality of originals 20 is repeatedly processed for production of a desired number of copies before the second original is subjected to the same processing instead of causing the plurality of originals to be consecutively passed one by one through the copying unit. In this mode, the original 20 separated from the pile is advanced at a high speed on the contact glass 11 by the conveyor belt 16. When the arrival of the leading end of the original is detected by the resist sensor 65, an encoder in the second motor 79 issues a pulse signal to stop the motion of the conveyor belt and the original is stopped at a fixed position. After the original has undergone scanning exposure (of cycles required for production of a desired number of copies) of the optical exposure system 64. Then, the conveyor belt 16 is set again into motion, enabling the original to be passed through the reverse feeding mechanism 31 and advanced at a high speed through the discharge route 40. During the present mode, since the original 20 is no longer required to be recovered for further feeding on the original feeding base 18, it is passed through the turn route 51 around the turn roller 50 and released onto the switchback discharge route 57. Thus, the upper side of the RADF cover 42 is utilized as a tray. In this case, the RADF cover 42 may be provided on the surface thereof with a stack cover 68 made of translucent acryl resin as indicated by an imaginary line in FIG. 1, for example, to provide protection for the originals 20 released onto the switchback release route 57.

Figure 3:
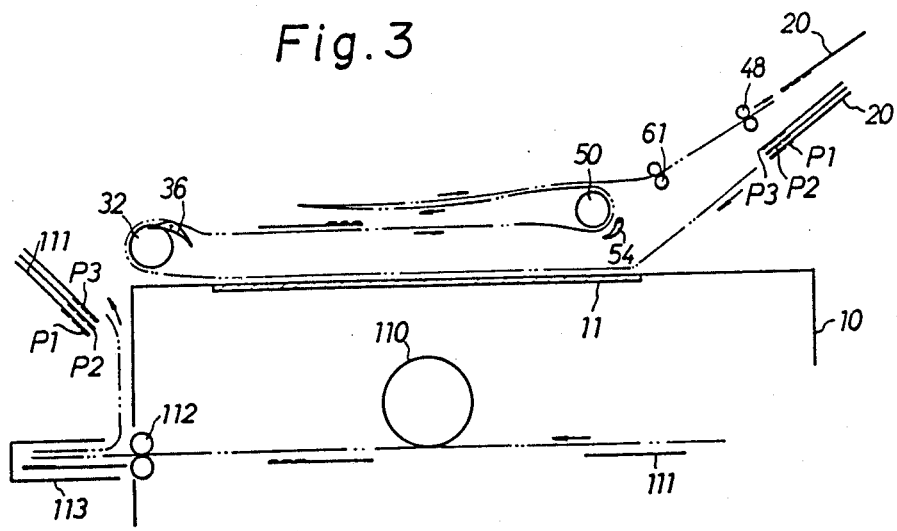
FIG. 3 is an explanatory diagram illustrating a route for passage of single-faced originals in the embodiment during the course of copying.

The originals 20 are partly of single-faced type and partly of double-faced type. Now, the treatment proper to each of the types will be described below. In the case of a plurality of single-faced originals, they are set on the original feeding base 18 as piled up consecutively in the order of their page numbers, with the first page P1 on the lowermost position and the image faces of the originals invariably turn downwardly as shown in FIG. 3. In this state, the originals 20 are successively fed out one by one toward the contact glass 11 from the lowermost original and subjected to the sheet through copying or the scanning copying. The originals is advanced through the turn roller 32 and the discharge route 40. In the sheet through copy mode, the original is advanced around the turn roller 50, switched back by the switchback discharge route 57, and released by the discharge roller 48 for recovery. In the scanning copy mode, the original is released onto the switchback discharge route 57. In response to the motion of the original 20 described above, the time for starting the feed of a copying paper 111 to a sensitive member 110 is synchronized within the copying machine proper 10 to effect control of paper feeding, for example, with the result that an image on the sensitive member 110 is transferred onto the transfer paper 111. Then, the copy paper 111 which has undergone the transfer of image is passed through a discharge roller 112, forwarded into a reversing part 113, and released as reversed onto a tray (not shown). Consequently, the transfer papers 111 are piled up as arranged consecutively in the order of page numbers with the image faces thereof turned downwardly.

Incidentally, in the case of single-faced originals, the discharge of the originals through the switchback reverse mechanism 49 brings about the following merit. When a plain RADF is considered as shown in FIG. 2, an original feeding base is installed on a conveyor belt 2 and originals 4 are successively forwarded through a looped circular conveyor route 6 and recovered. While the originals 4 are cyclically conveyed in a number of times, they are gradually disposed to be easily curled under the influence of the shape of the circular conveyor route 6 and the pressure of the turn roller 7, for example. As the result, they extrude from the original feeding base and frequently cause such adverse phenomena as jam. In accordance with the present embodiment, as readily noted from the flow of originals 20 shown in FIG. 3, since the originals are discharged after they are turned by the turn roller 50 in the direction opposite the direction in which they have been turned by the turn roller 32, the curl once imparted is corrected. Particularly since these turn rollers 32, 50 are formed in substantially equal diameters, the effect of correction of the curl is conspicuous and the efficiency of recovery of originals in the original feeding base 18 is high and the possibility of inducing the phenomenon of jam is diminished.

Now, the treatment of originals 20 and transfer papers 111 to be involved when a plurality of double-faced originals are given to be copies will be described below with reference to FIG. 4.

Similarly in this case, the originals 20 are set on the original feeding base 18 as piled up consecutively in the order of their page numbers from the lowermost original. The separation and feeding of the individual originals to the contact glass 11 is carried out in entirely the same manner as in the case of single-faced originals. Since the originals are of the double-faced type in this case, the first original placed on the contact glass 11 is subjected to the copying in such a manner that the first page P1 will constitute the lower side and the second page P2 the upper side respectively. After the originals has undergone exposure to light, it is forwarded toward the reverse route 35. In this case, since the second page p2 remains yet to be copied, the switch claw 36 is switched into a state of closing the discharge route 40 side. As the result, the original 20 is forwarded around the turn roller 32 and into the reverse route 38 this time. The conveyor belt 16 is also driven backwardly. As the result, the original 20 is set on the contact glass 11 in the opposite direction. In this state, the second page P2 of the original is turned downwardly and is ready for exposure to light. In response to the conveyance of the original 20 in the manner described above, the transfer sheet 111 has a copy formed on one side thereof by the sensitive member 110, then reversed by the reverse part 114, and released temporarily into an intermediate tray 115. Then, from the intermediate tray 115, the transfer sheet 111 now bearing a copied image on one side thereof is forwarded through a paper feed roll 116 and a resist roller 117 as synchronized with the motion of the original 20 again to the sensitive member 110, to complete a double-faced. After the production of copies on both sides thereof, the transfer paper 111 is forwarded through the discharge roller 112 and released directly into the tray. In the meantime, the original 20 which has had both sides thereof exposed to light is advanced toward the reverse route 35. This time, since the switch claw 36 has been switched to a new route, the original is advanced through the discharge route 40. Then, since the switch claw 54 of the turn roller 50 is now in a state inhibiting the advance of the original toward the switchback discharge route 57, the original 20 is caused to advance straight through the straight route 52 and then released by the discharge roller 48 onto the original feeding base 18. As the result, the double-faced originals are recovered in a set state. When the originals are released onto the switch-back discharge route 57, they are piled up in an incorrect order.

Figure 4:
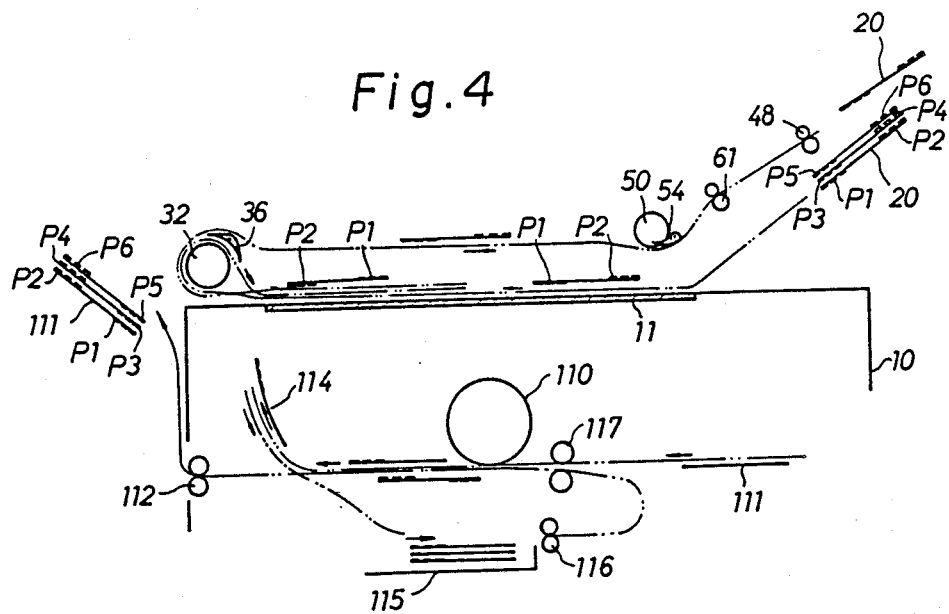
FIG. 4 is an explanatory diagram illustrating a route for passage of double-faced originals of the embodiment during the course of copying.

As noted from the comparison of FIG. 3 and FIG. 4, the route for conveyance of the single-faced originals is different from that of the double-faced originals. Since the route proper for either of the types of originals can be selected by means of the switch claws 36, 54, the originals are not required to be passed through any useless route. In the case of the double-faced originals, the sheet through copy mode cannot be selected because the operation includes a step for returning the originals 20 in the opposite direction on the contact glass 11.

In any event, the present embodiment provides a sequential page feeding RADF 12 which is capable of sheet through copying and, therefore, enables the copying intervals to be shortened and the CPM to be improved by continuously feeding the originals 20 for copying. Since the constructions is capable of effecting not merely the sheet through copying but also the scanning copy mode which is common for ADF, it contributes to diversification of the mode of copying. No matter which copy mode may be selected, the originals can be conveyed at a fixed speed on the conveyor belt 16 in a state free from the influences of pressure of separation because the position of the resist sensor 65 for controlling the conveyance of originals 20 is separated from the original separating and feeding part by a distance greater than the maximum original length. During the through copy mode, therefore, the copied images enjoy high quality because of the freedom from the adverse phenomena such as jittering and the accuracy of alignment of the leading end of original is enhanced. During the scanning copy mode, the accuracy of the stop of original on the contact glass 11 can be improved by the same token. Further in the case of double-faced originals, they can be conveyed through the shorted possible route without entailing any idle feeding. Further, the load required for the conveyance through the discharge system can be lessened since the distance between the turn rollers 32, 50 is greater than the maximum original length. Moreover, since the upper side of the RADF cover 42 can be utilized as a switchback discharge route 57 or a discharge tray, an original which is note desired to be passed repeatedly through the conveyor route may be released onto the upper side of the RADF cover and consequently prevented from sustaining unwanted harm.

Figure 5:
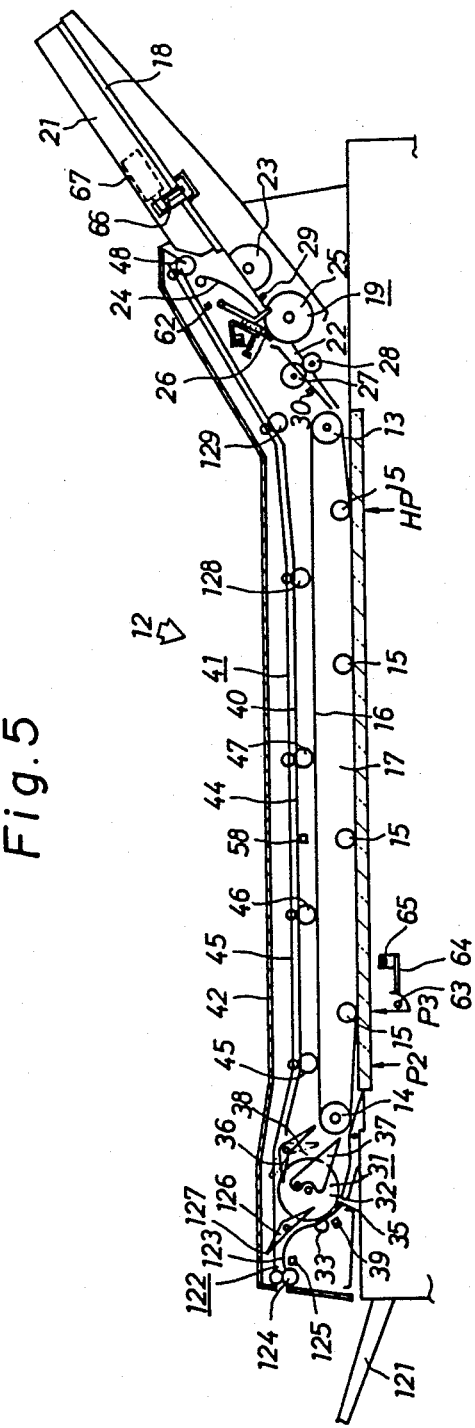
FIG. 5 is a side view illustrating another embodiment of this invention.

Then, other embodiments of the present invention will be described below with reference to the diagrams of FIGS. 5 to 7. From the overall point of view, they are similar to the RADF 12 of the preceding embodiment, excepting ideas for compaction are reflected. Like parts are denoted by like reference numerals. In one of such other embodiments, an original discharge tray 121 is disposed to the left of the contact glass 11. A switchback reverse conveyor mechanism 122 which constitutes a reverse and discharge mechanism together with said reverse feeding mechanism and said discharging device is disposed to the left of the upper side of the reverse roller 32, namely in the direction opposite that of the discharge route 40. This switchback reverse conveyor mechanism 122 comprises a switchback route 123 formed by opening the RADF cover 42 in the horizontal direction, a reversing roller 124 disposed at the outlet, and an original sensor 125 positioned directly before the reversing roller 124. There is provided a switch claw 126 serving the purpose of switching the direction of advance of the original 20 having conveyed to the turn route 35 around the aforementioned turn roller 32 between the discharge route 40 side and the aforementioned switchback route 123 side. This switch claw 126 can be utilized also for the purpose of guiding the original 20 when it is desired to be forwarded through the aforementioned switchback route 123 and returned toward the discharge route 40. This switch claw 126 is further provided with a Mylar valve 127 adapted to prevent backflow.

The aforementioned discharge route 40, as compared with the countertype in the preceding embodiment, is formed linearly as far as the discharge roller 48 part and is additionally furnished with paired conveyor rollers 128, 129.

In still another of the embodiments, one motor is adapted to produce both normal and reverse drivings similarly to the turn roller 32 as far as the reversing roller 124 or the paired conveyor rollers 128, 129. The discharge roller 48 is driven independently by one motor. In this arrangement, the speed of the discharge roller can be freely changed for the purpose of improving the efficiency of recovering and stacking originals 20 on the original feeding base 18. This stacking property is further enhanced by impartation of nerve to the originals 20.

In the construction described above, the scanning copy mode in which the optical exposure system 64 is caused to produce a scanning motion for exposure and the sheet through copy mode in which the optical exposure system 64 is kept in a fixed state and the original 20 is exposed to light as simultaneously conveyed can be carried out in entirely the same manner as in the preceding embodiment.

Figure 6:
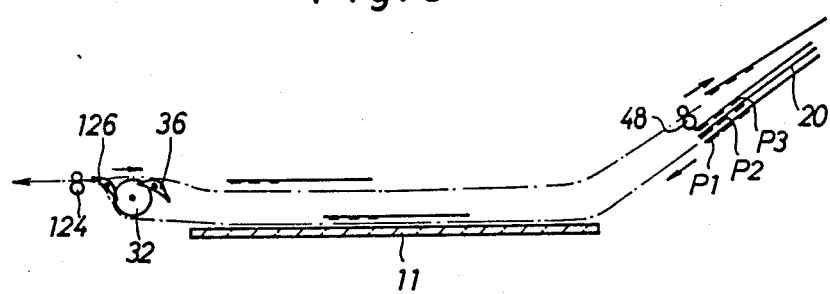
FIG. 6 is an explanatory diagram illustrating a route for passage of single-faced originals in the aforementioned another embodiment during the course of copying.
Figure 7:
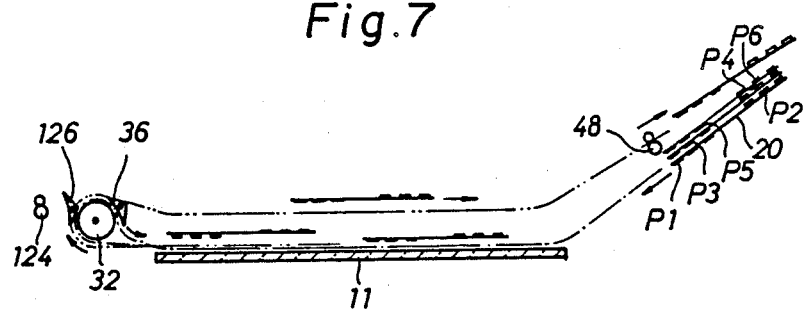
FIG. 7 is an explanatory diagram illustrating a route for passage of double-faced originals in the aforementioned another embodiment during the course of copying.

When single-faced originals are given to be copied, the conveyor route for the original shown in FIG. 6 is selected. When the original 20 which has been exposed to light as simultaneously conveyed onto the contact glass 11 enters the turn route 35 on the turn roller 32 side, since the switch claw 126 has been turned to keep the switchback route 123 side open, the original 20 is advanced although this route and then forwarded by the reversing roller 124 toward the exterior of the RADF cover 42. In this case, the original which has emerged from the RADF cover 42 hangs down and is held up by the discharge tray 121 disposed below. When the original sensor 125 detects the arrival of the rear end of the original 20, the reversing roller 124 is temporarily stopped and then driven backwardly. At the same time, the switch claw 126 is turned to open the discharge route 40 side. As the result, the original 20 which has advanced through the switchback route 123 is caused by the reversing roller 124 to change its direction of travel in the pattern of a switchback and then forwarded through the discharge route 40. It is then released by the discharge roller 48 onto the original feeding base 18 by way of recovery. Consequently, the originals 20 are recovered in the same state as originally set.

Where single-faced originals are to be processed in the scanning copy mode, the originals 20 which have undergone exposure to light may be directly released onto the discharge tray 121 by means of the switchback route 123 and the reversing roller 124. This operation permits a reduction in the route for passage of the original and proves to be advantageous for originals 20 of the nature not desired to be exposed to the friction of passage.

Where double-faced originals 20 are given to be copied, they are forwarded through a route as illustrated in FIG. 7. When the front page of the double-faced original 20 is exposed to light on the contact glass 11, the original is advanced toward the turn route 35. In this case, since the switch claw 126 and 36 have been turned to open the reverse route 38 side around the turn roller 32, the original 20 is advanced through this reverse route 38. At this time, the double-faced original 20 is in a state turned upside down. Also, the conveyor belt 16 is set revolving in the opposite direction. As the result, the original 20 is set on the contact glass 11 with the reverse side thereof turned downwardly and in that state exposed to light. After this exposure, the switch claws 126, 36 are turned to open the ordinary discharge route 40 side. Thus, the original is forwarded around the turn roller 32 and through the discharge route 40 and released by the discharge roller 48 onto the original feeding base 18. In this case, too, the originals are recovered in the same state as initially set.

Figure 8:
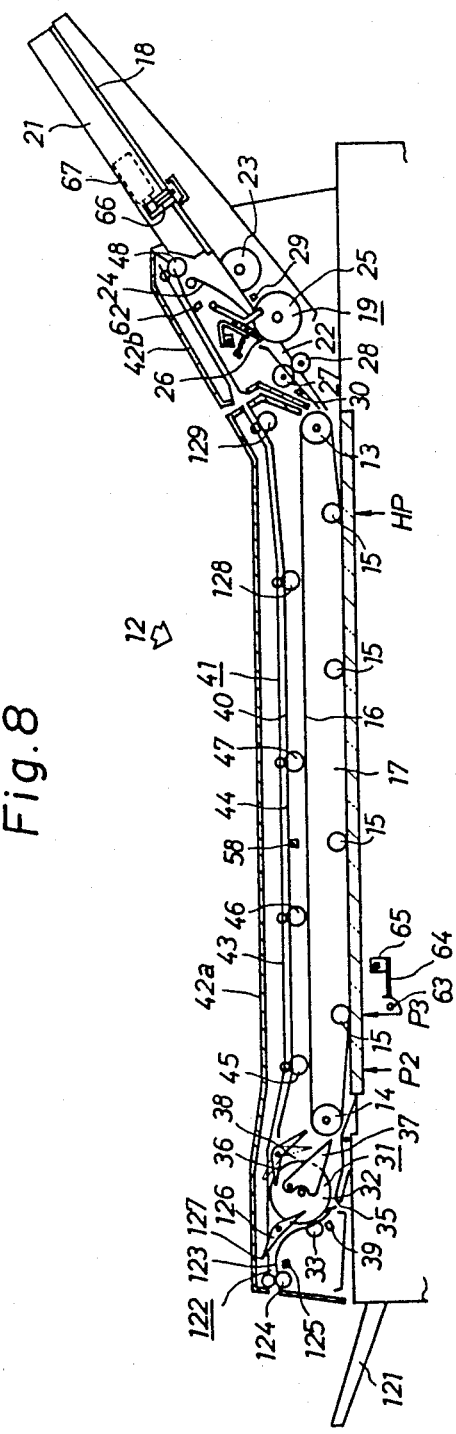
FIG. 8 is a side view illustrating a modification of the aforementioned another embodiment.

In yet another embodiment, the RADF cover 42 is formed as an integral component. It is optional that it may be split into two parts, i.e. a RADF cover 42a extending from the neighborhood of the turn roller 32 through the neighborhood of the conveyor roller 129 and a RADF cover 42b formed on the original separating and feeding part as illustrated in FIG. 8, with only the RADF cover 42a side adapted to be freely shut and opened.

What is claimed is:

1. An automatic original circulating and feeding apparatus comprising:
   (a) an original feeding base for receiving a plurality of originals piled up thereon;
   (b) an original separating and feeding mechanism for successively separating the piled-up originals on said original feeding base one by one and feeding the separated originals one by one in the order separated;
   (c) a belt conveyor mechanism disposed in an exposure part for exposing each of said originals fed; and
   (d) a sensor disposed at a position separated by at least the largest original length from said original separating and feeding mechanism, for selectively setting a scanning copy mode for forwarding a given original to a predetermined position above said exposure part, stopping the given original at the predetermined position, and setting an optical exposure system into a scanning motion for exposure or a sheet through copy mode for stopping said optical exposure system relative to said exposure part and forwarding the given original by said belt conveyor mechanism for exposure and for controlling the position of the given original for a copy mode selected.

2. An apparatus according to claim 1, in which:
   (a) the originals on said original feeding base are piled up such that image faces thereof are turned downwardly and
   (b) said original separating and feeding mechanism separates said filed-up originals on said original feeding base from a lowermost original.

3. An apparatus according to claim 2, in which said belt conveyor mechanism comprises:
   (a) a belt conveyor;
   (b) a reverse feeding mechanism disposed downstream of said belt conveyor in a direction in which said exposed originals are fed for reversing the exposed originals fed from said belt conveyor;
   (c) a discharging device disposed in the vicinity of said reverse feeding mechanism for feeding the exposed and reversed originals fed from said reverse feeding mechanism; and
   (d) a discharge feeding mechanism disposed in said discharging device for selectively discharging the exposed and reversed originals from said discharging device to the outside of said apparatus through an opening provided on a cover disposed on said discharging device or to said original feeding base.

4. An apparatus according to claim 1, in which said belt conveyor mechanism comprises:
   (a) a belt conveyor;
   (b) a reverse feeding mechanism disposed downstream of said belt conveyor in a direction in which said exposed originals are fed for reversing the exposed originals fed from said belt conveyor;
   (c) a discharging device disposed in the vicinity of said reverse feeding mechanism for feeding the exposed and reversed originals fed from said reverse feeding mechanism; and
   (d) a discharge feeding mechanism disposed in said discharging device for selectively discharging the exposed and reversed originals from said discharging device to the outside of said apparatus through an opening provided on a cover disposed on said discharging device or to said original feeding base.

5. An apparatus according to claim 2, in which said belt conveyor mechanism comprises:
   (a) a belt conveyor and
   (b) a reverse and discharge mechanism disposed downstream of said belt conveyor in a direction in which said exposed originals are fed for reversing the exposed originals fed from said belt conveyor and for selectively discharging the exposed and reversed originals to the outside of said apparatus through an opening provided on a sidewall of a cover disposed on said reverse and discharge mechanism or to said original feeding base.

6. An apparatus according to claim 5, in which said cover is split into two parts.

7. An apparatus according to claim 1, in which said belt conveyor mechanism comprises:
   (a) a belt conveyor and
   (b) a reverse and discharge mechanism disposed downstream of said belt conveyor in a direction in which said exposed originals are fed for reversing the exposed originals fed from said belt conveyor and for selectively discharging the exposed and reversed originals to the outside of said apparatus through an opening provided on a sidewall of a cover disposed on said reverse and discharge mechanism or to said original feeding base.

8. An apparatus according to claim 7, in which said cover is split into two parts.

* * * * *